(12) United States Patent
Puzey

(10) Patent No.: US 7,118,502 B2
(45) Date of Patent: Oct. 10, 2006

(54) DRIVE ARRANGEMENT

(76) Inventor: Michael Roydon Puzey, PO Box 1039, Ferndale (ZA) 2160

( * ) Notice: Subject to any disclaimer, the term of this patent is extended or adjusted under 35 U.S.C. 154(b) by 406 days.

(21) Appl. No.: 10/671,596

(22) Filed: Sep. 29, 2003

(65) Prior Publication Data

US 2005/0098368 A1 May 12, 2005

(30) Foreign Application Priority Data

Dec. 5, 2002 (ZA) .................................. 2002/9859

(51) Int. Cl.
- *F16H 59/06* (2006.01)
- *F16H 19/04* (2006.01)
- *B60K 17/02* (2006.01)

(52) U.S. Cl. .................... 474/60; 474/70; 180/350; 192/48.1

(58) Field of Classification Search .................. 474/70, 474/73, 69, 74; 280/87.05, 220; 180/181, 180/220, 350–357; 192/105 BA, 105 CD, 192/48.2, 48.3, 42, 48.1
See application file for complete search history.

(56) References Cited

U.S. PATENT DOCUMENTS

| | | | | |
|---|---|---|---|---|
| 2,809,535 A | * | 10/1957 | Hein et al. ..................... 474/70 |
| 3,436,977 A | * | 4/1969 | Gredell ......................... 474/70 |
| 4,830,165 A | * | 5/1989 | Guslits et al. .......... 192/110 R |
| 4,946,016 A | * | 8/1990 | Torres ........................ 192/48.2 |
| 5,334,105 A | | 8/1994 | Wang |
| 5,871,412 A | | 2/1999 | Moser |
| 6,505,845 B1 | * | 1/2003 | Fong ........................... 280/228 |
| 6,752,229 B1 | * | 6/2004 | Ho .............................. 180/181 |
| 6,866,275 B1 | * | 3/2005 | Puzey ..................... 280/87.05 |
| 2002/0117343 A1 | | 8/2002 | Kao |

FOREIGN PATENT DOCUMENTS

| | | |
|---|---|---|
| DE | 44 10 322 | 9/1995 |
| DE | 299 18 793 | 3/2000 |
| EP | 0 362 033 | 4/1990 |
| JP | 07-239596 A * | 9/1995 |
| WO | 00 41925 | 7/2000 |

\* cited by examiner

*Primary Examiner*—Marcus Charles
(74) *Attorney, Agent, or Firm*—Wenderoth, Lind & Ponack, L.L.P.

(57) ABSTRACT

A scooter drive arrangement which includes a first shaft, with a one-way bearing and a clutch, which is connected to a driven wheel, and a second shaft, which is rotated by an engine, through a centrifugal clutch, which has two fixed pulleys which respectively drive the clutch and the one-way bearing, through belts.

10 Claims, 7 Drawing Sheets

DRIVE ARRANGEMENT

BACKGROUND OF THE INVENTION

This invention relates to a drive arrangement which allows for the transfer of rotational drive from a prime mover to an output drive system.

SUMMARY OF INVENTION

The invention provides a drive arrangement for connection between a prime mover and a driven component. The drive arrangement includes a first shaft which is connected for rotatably driving the driven component, a second shaft which is connected for rotation by the prime mover, a first drive transfer system which is connected to the first and second shafts, a second drive transfer system which is connected to the first and second shafts, the first drive transfer system including a first variable drive member which is selected from a one-way drive mechanism and a first clutch and which is connected to one of the first and second shafts, a first fixed drive member which is connected to the other of the first and second shafts, and a first endless flexible member which transfers rotational drive between the first variable drive member and the first fixed drive member, and the second drive transfer system including a second clutch which is connected to one of the first and second shafts, a second fixed drive member which is connected to the other of the first and second shafts, and a second endless flexible member which transfers rotational drive between the second clutch and the second fixed drive member.

Preferably the drive arrangement includes a centrifugal clutch between the prime mover and the second shaft.

The first shaft is preferably parallel to the second shaft.

The one-way drive mechanism may be a one-way bearing or a ratchet or any equivalent mechanism.

Each endless flexible member may be a chain which passes over complementary cogs, or a ribbed belt which passes over complementary ribbed pulleys.

Each drive transfer system transfers rotational drive, to the first shaft, at a respective predetermined ratio of input to output rotational speeds.

Preferably the first and second drive transfer systems are connected, spaced apart from each other, to the first and second shafts.

The drive arrangement may be provided in combination with supporting structure to which the first and second shafts are mounted and which allows limited relative movement of the first shaft towards or away from the second shaft thereby to adjust tensions in the first and second endless flexible members.

The invention also extends to a vehicle which includes a drive arrangement of the aforementioned kind, a prime mover connected to drive the second shaft, a wheel, and a third endless flexible member which transfers rotational drive from the first shaft to the wheel.

The invention also provides a drive arrangement which includes a first drive transfer system which transfers rotational drive, in a first rotational sense and at a first speed ratio, from a prime mover to a final drive system, and which allows the final drive system to rotate in the first rotational sense independently of the prime mover, a second drive transfer system, and an actuator which is operable to enable the second drive transfer system to transfer rotational drive, in the first rotational sense and at a second speed ratio which is greater than the first speed ratio, from the prime mover to the final drive system, and to disable the second drive transfer system from transferring rotational drive from the prime mover to the final drive system.

Preferably the first drive transfer system includes a one-way drive mechanism which allows for the transfer of rotational drive in the aforementioned manner.

The one-way drive mechanism is preferably a one-way bearing.

The second drive transfer system may include a clutch which is actuable by the actuator to enable or disable the second drive transfer system in the aforementioned manner.

The drive arrangement of the invention may be used in diverse applications but finds particular application in imparting drive to a driven component of a vehicle. The vehicle may be a two-wheeled scooter, a three-wheeled or four-wheeled vehicle or a non-wheeled vehicle such as a snowboard or snow ski.

The invention is intended to extend in particular to a vehicle which includes a prime mover, a driven wheel, a final drive system for imparting drive to the driven wheel, and a drive arrangement of the aforementioned kind which is connected to the prime mover and the final drive system.

The invention also extends to a vehicle which includes a wheel, a prime mover, a drive arrangement which has a shaft which is connected to the prime mover and an output drive member, and an endless flexible member which transfers rotational drive from the output drive member to the wheel, and wherein the drive arrangement is movable to a limited extent to adjust the tension in the endless flexible member.

BRIEF DESCRIPTION OF THE DRAWINGS

The invention is further described by way of examples with reference to the accompanying drawings in which.

DESCRIPTION OF PREFERRED EMBODIMENTS

Figure 1:
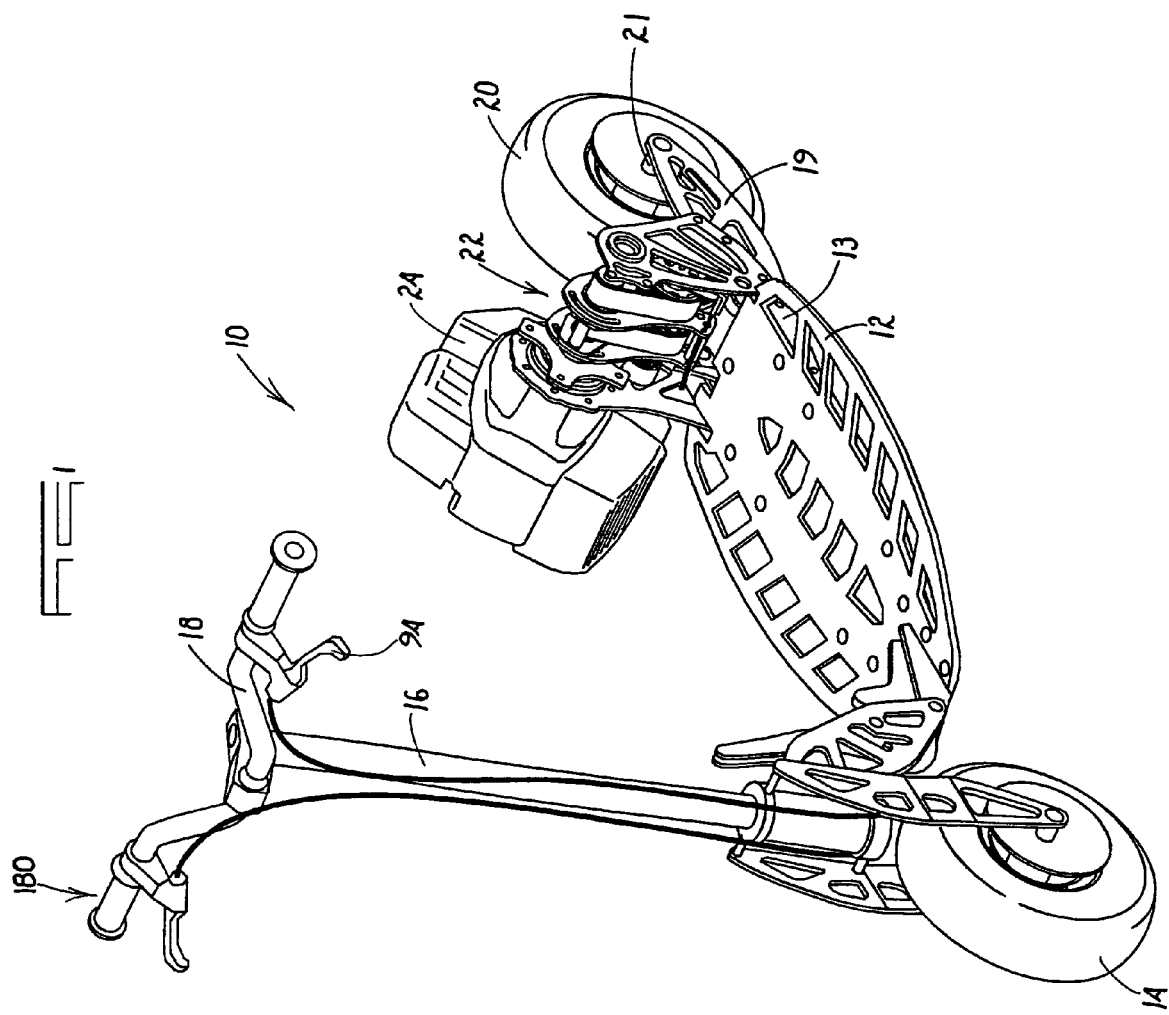
FIG. 1 is a perspective view of a small motorized two-wheeled vehicle such as a scooter which includes a drive arrangement according to the invention.

FIG. 1 of the accompanying drawings illustrates a small two-wheeled vehicle such as a scooter 10 which includes a footboard 12 fixed to a chassis 13, a front wheel 14, a steering column 16 and a handlebar 18 which are mounted to the chassis, mounting plates 19 (only one plate being visible in FIG. 1) which extend from the chassis, a rear wheel 20 which is mounted to the plates 19 so that it is rotatable about an axle 21, a drive arrangement 22 and a prime mover 24, in this instance a petrol or gas engine, for imparting drive to the rear wheel through the drive arrangement 22.

The construction of the scooter is not described herein in detail and the following description is largely confined to those aspects of the scooter which relate to the construction and operation of the drive arrangement 22.

Figure 2:
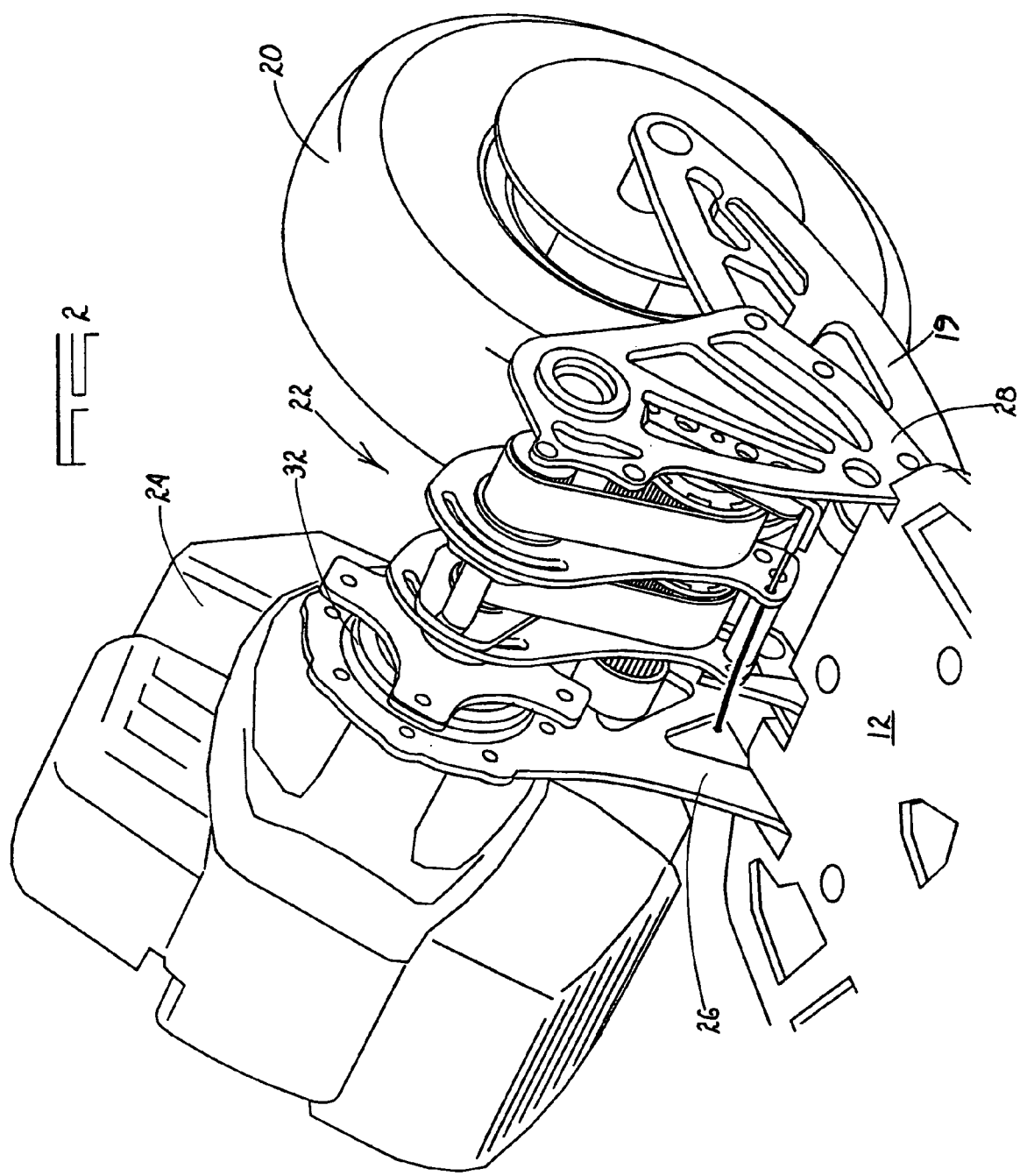
FIG. 2 is a view on an enlarged scale of a rear portion of the scooter of FIG. 1.

FIG. 2 illustrates the rear end of the scooter in enlarged detail. The drive arrangement 22 is supported on upstanding plates 26 and 28 respectively which are fixed to the footboard or chassis 12. Only one plate is visible in the drawings. The engine 24, which is of conventional construction, is mounted to the plate 26 and has an output shaft, not shown, which is connected to a centrifugal clutch 32.

Figure 3:
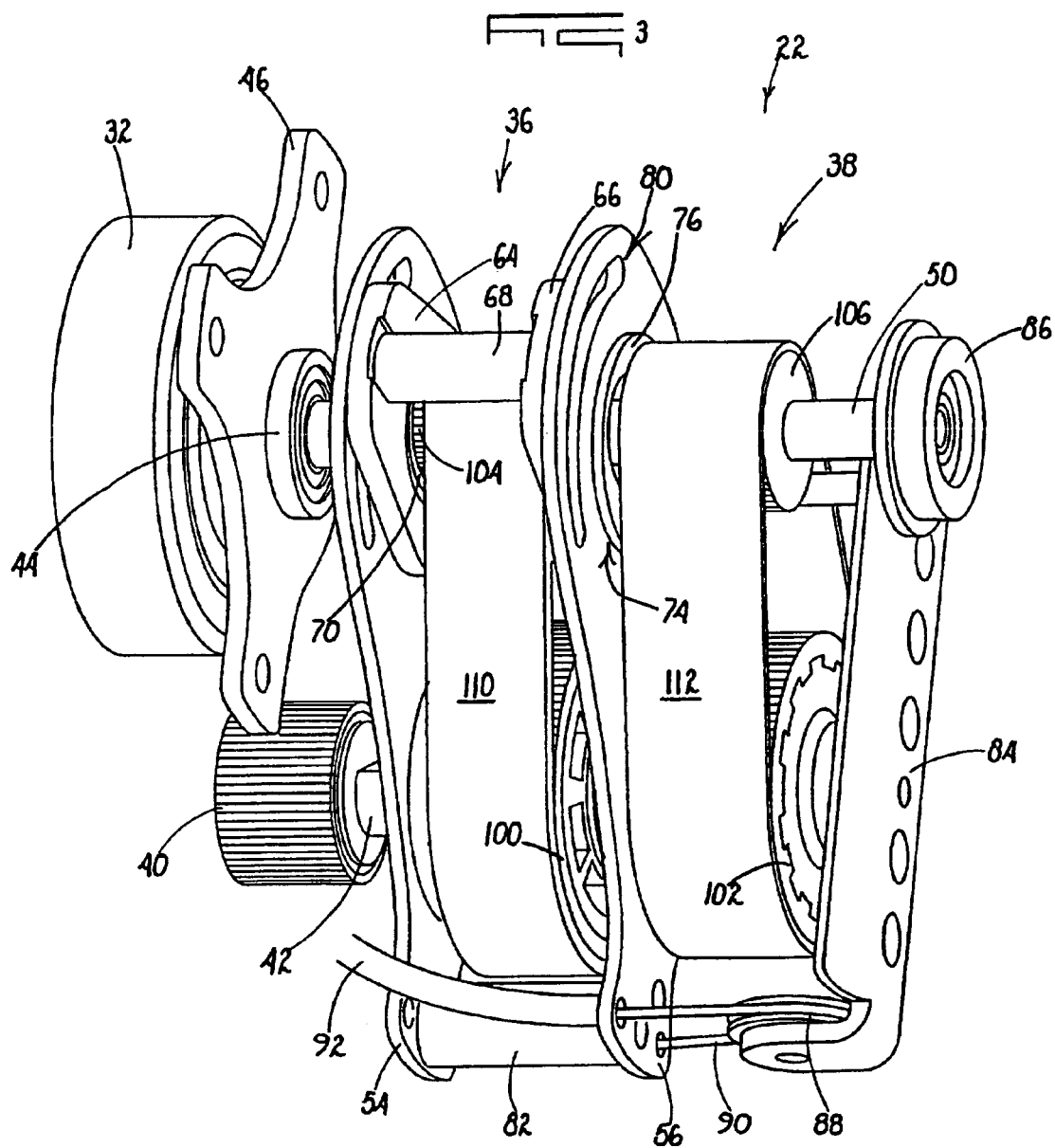
FIG. 3 shows the drive arrangement which is included in the scooter of FIG. 1 on an enlarged scale and partly exploded.

As is shown in FIG. 3 the drive arrangement 22 includes a first drive transfer system 36, and a second drive transfer system 38. An output drive member 40 in the form of a small toothed pulley is mounted to a first shaft 42 which is connected to the first drive transfer system 36 and to the second drive system 38. The centrifugal clutch 32 is coupled via a bearing 44, mounted to a plate 46, to a second shaft 50.

Figure 4:
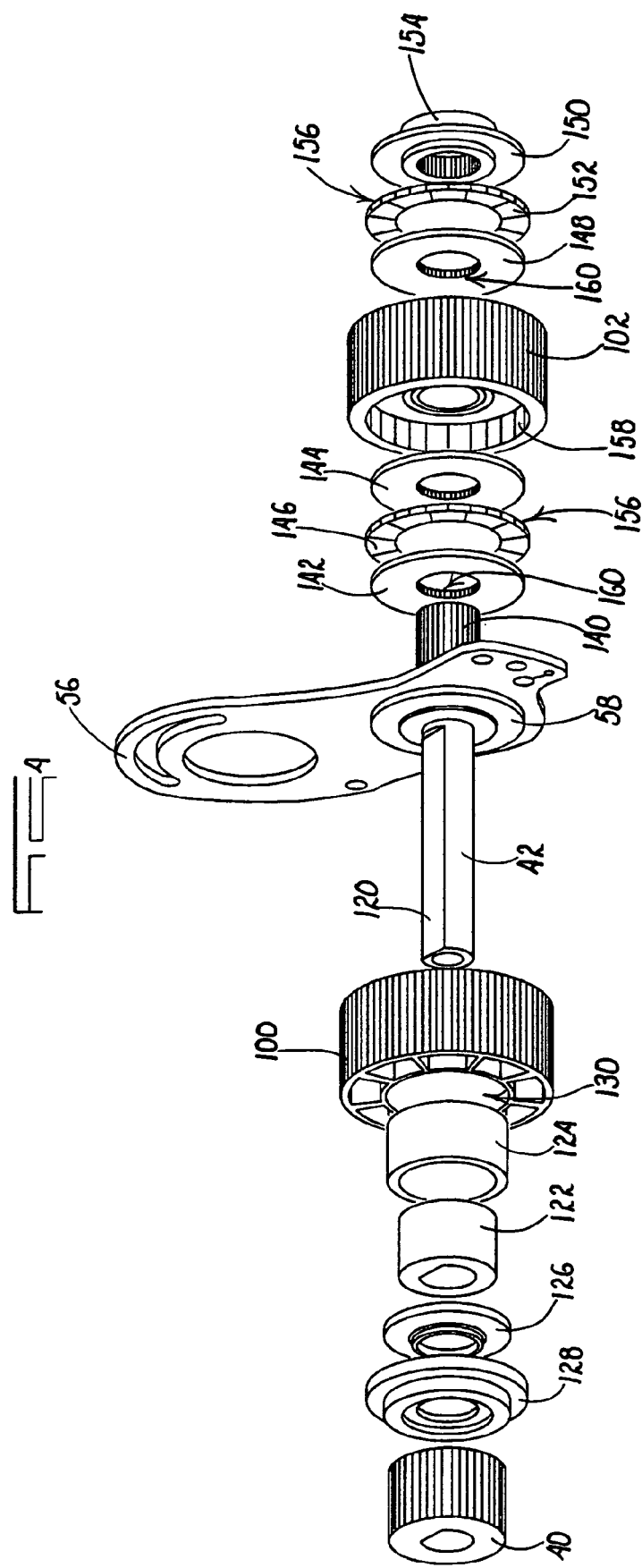
FIG. 4 is an exploded view of a drive assembly in the drive arrangement shown in FIG. 3.

The first shaft 42 is mounted to bearings which are supported in plates 54 and 56 respectively. FIG. 4 shows the plate 56 with a corresponding bearing 58. A similar bearing is mounted to the plate 54 but is not visible in the drawings.

The second shaft 50 is fixed to two small plates 64 and 66 respectively which are spaced from each other by a brace 68. A bearing is used to locate the second shaft in each plate 64 and 66. Only one bearing, designated 70, is shown mounting the second shaft to the plate 64 and a similar bearing, which is not visible in FIG. 3, is used to mount the shaft 50 to the plate 66.

The plate 56 is formed with a circular opening 74 and the plate 66 has a circular formation 76 which extends into the opening. The corresponding bearing, to which the shaft 50 is mounted, is offset i.e., the shaft 50 does not pass through the geometrical center of the circular formation 76. A similar arrangement is adopted for the plates 64 and 54 for the plate 64 has a circular formation which extends into a circular opening in the plate 54 and the bearing 70 is offset so that the shaft 50 is not centrally positioned in the circular formation.

The two circular formations (76) are rotatable in unison inside the respective circular openings (74). In this way the position of the shaft 50 can be adjusted to a limited extent, away from or towards the shaft 42.

Arcuate slots 80 are formed in the plates 54 and 56. Fasteners, not shown, are passed through the slots and are respectively engageable with the plates 64 and 66 and, when tightened, lock the plates 64 and 66 to the plates 54 and 56 respectively in a desired orientation.

A brace 82 spaces lower ends of the plates 54 and 56 from each other. An actuator 84 depends downwardly from an idler bearing 86 which is fixed to an outer end of the second shaft 50. At a lower end the actuator is bent through 90° and a pulley 88 is attached to the bent end of the actuator. A cable 90 has one end attached to the plate 56 and is passed around the pulley into a sheath 92 which bears against an inner side of the plate 56. The cable sheath 92 extends to a handle 94 on the steering column 16 of the scooter.

A first drive member 100 is mounted to the first shaft 42 between the plates 54 and 56 while a second drive member 102 is mounted to the shaft between the plate 56 and the actuator 84. A third drive member 104 is mounted to the second shaft between the plates 64 and 66 while a fourth drive member 106 is mounted to the second shaft between the plate 56 and the idler bearing 86. Each drive member is in the nature of a toothed pulley. The diameter of the pulley 100 is greater than the diameter of the pulley 102 while the diameter of the pulley 104 is less than the diameter of the pulley 106. A first drive transfer device in the form of a ribbed endless belt 110 connects the third drive member 104 to the first drive member 100 while a second drive transfer device in the form of a ribbed endless belt 112, of a slightly different loop length, connects the fourth drive member 106 to the second drive member 102.

The third and fourth drive members 104 and 106 respectively are directly fixed to the second shaft 50 and at all times are rotatable together with the shaft.

FIG. 4 illustrates, in an exploded view, various components which are mounted to the first shaft 42. The plate 54 has been omitted to simplify the illustration but in practice is positioned to the right of the output drive member 40.

The shaft 42 has a flat or key surface 120 and the output drive pulley 40 has a complementary flat formation which enables the pulley to be directly fixed to the shaft. A mounting collar 122 is press-fitted to the shaft 42 and a one-way bearing 124 is mounted to the collar 122. A washer 126 and a thrust bearing 128 are positioned between the collar and the pulley 40. The first drive member 100 is formed with a centrally located hole 130 and the one-way bearing 124 is press-fitted into the hole.

A small cog 140 is mounted to the shaft 42 on a right-hand side of the plate 56. Threaded over the cog, in succession, are first and second pressure plates 142 and 144 with an intermediate clutch plate 146, the second drive member 102, and third and fourth pressure plates 148 and 150 with an intermediate clutch plate 152, and a thrust bearing 154. The clutch plates 146 and 152 have outer toothed formations 156 which are engaged with similar complementary formations 158 on an inner surface of the second drive member while the pressure plates 142, 144, 148 and 150 have respective toothed formations 160 which thread directly onto splined surfaces of the cog 140.

The components shown in FIG. 4 are kept in position on the shaft 42 by means of spring washers, split rings or any other appropriate fastening devices. The actuator 84 bears against the thrust bearing 154. It is evident that, by exerting tension on the cable 90, the actuator is moved towards the plate 56 thereby placing pressure on the thrust bearing 154. If the cable tension is released the actuator moves away from the thrust bearing 154, to a limited extent, due to its inherent resilience.

In use of the drive arrangement the engine 24 imparts rotational drive to the second shaft 50. The shaft only starts rotating when the engine speed is sufficiently great to cause the centrifugal clutch 32 to engage. The engine speed is controlled in a conventional manner using a cable which is movable by rotating a handle grip 180 on the handlebar 18 to accelerate or decelerate the engine.

As has been pointed out the third drive member 104 and the fourth drive member 106 are at all times rotated in unison with the second shaft 50. Due to the relative sizes of the drive members 100 to 106 the drive ratio of the first drive transfer system 36 is less than the drive ratio of the second drive transfer system 38. Each of the belts 110 and 112 is driven by the respective drive member 104 or 106. Rotational drive is therefore imparted to the respective drive members 100 and 102. If the cable 90 is not tensioned then the actuator 84 does not exert any meaningful force on the thrust bearing 154 and the pairs of pressure plates 142 and 144, and 148 and 150, are driven by the cog 140 but do not frictionally engage in a torque-transferring manner with the respective clutch plates 146 and 152. Consequently drive is not transferred from the second drive member to the shaft 42 and for practical purposes the second drive member 102 rotates freely around the shaft 42.

The one-way bearing 124 is mounted, in a directional sense, so that drive is transferred from the first drive member 100 via the collar 122 to the shaft 42. The shaft drives the output pulley 40 and thus directly imparts drive to the rear wheel 20 of the scooter.

If the cable 90 is tensioned then the actuator 84 is drawn towards the plate 56 and in so doing it forces the thrust bearing 154 towards the second drive member 102. The plate 56 provides a reaction surface for the assemblies of pressure plates and clutch plates. Thus the thrust bearing 154 forces the components which are shown to the right of the plate 56 in FIG. 4, towards the plate, and in so doing the plates 146 and 152 respectively are urged into torque-transferring engagement with the respective pairs of pressure plates 142 and 144, and 148 and 150, respectively. When this happens rotational drive is transferred from the second drive member 102 directly to the shaft 42.

The cable can be kept in a tensioned state, in which the clutch assemblies are engaged and torque is transferred to the shaft 42 by the pulley 102, by means of a simple releasable, locking device which acts on the handle 94.

The drive ratio of the second drive transfer system is greater than the drive ratio of the first drive transfer system. Consequently the shaft 42 starts rotating at a greater speed than the speed of rotation which results from the first drive transfer system i.e., directly from the first drive member 100. An inner race of the one-way bearing 124 which is fixed to, and driven by, the first shaft 42, therefore accelerates relatively to the first drive member. The drive pulley 40, which is directly driven by the first shaft 40, also accelerates and the drive speed to the rear wheel is increased.

Clearly the one-way bearing allows torque to be transferred from the drive member 100 to the shaft in one direction but, in the reverse direction, torque cannot be transferred. The inner race of the bearing, against the shaft 42, can rotate independently of the first drive member when the rotational speed of the shaft exceeds the rotational speed of the first drive member which, as noted, is fixed by the drive ratio of the first drive transfer system.

If the tension in the cable 90 is reduced then the clutch which is constituted by the pressure plates and clutch plates starts disengaging and the torque transferred via the second drive transfer system to the shaft 42 decreases. A point is reached at which the first drive transfer system again engages and drive is transferred at a lower speed ratio via the first drive transfer system to the shaft 42.

Figure 6:
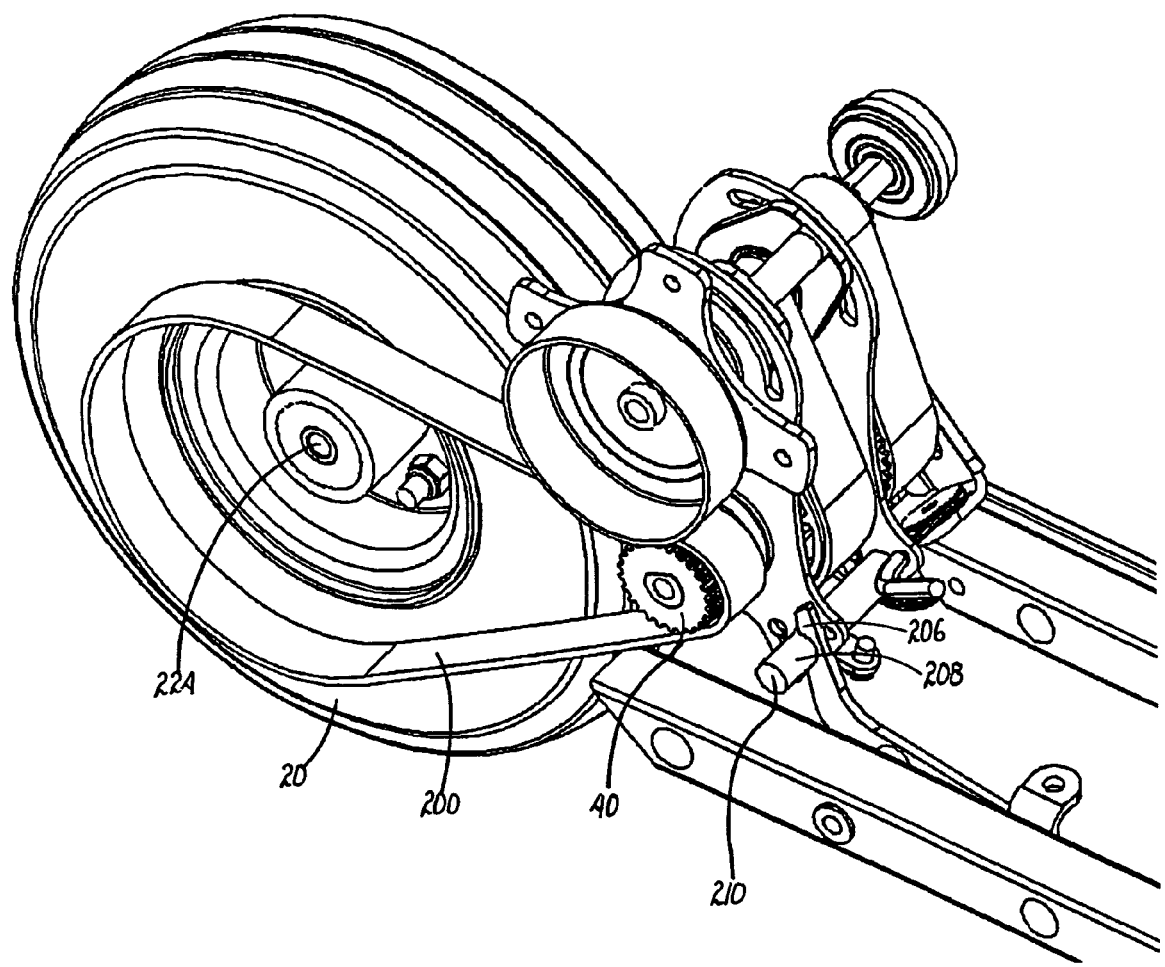

As is shown in FIG. 6 the drive pulley 40 imparts drive to the rear wheel 20 via a ribbed belt 200. A significant benefit which arises from the construction which has been described hereinbefore is the capability of adjusting the tension in the belt 200 with minimal effort.

Figure 5:
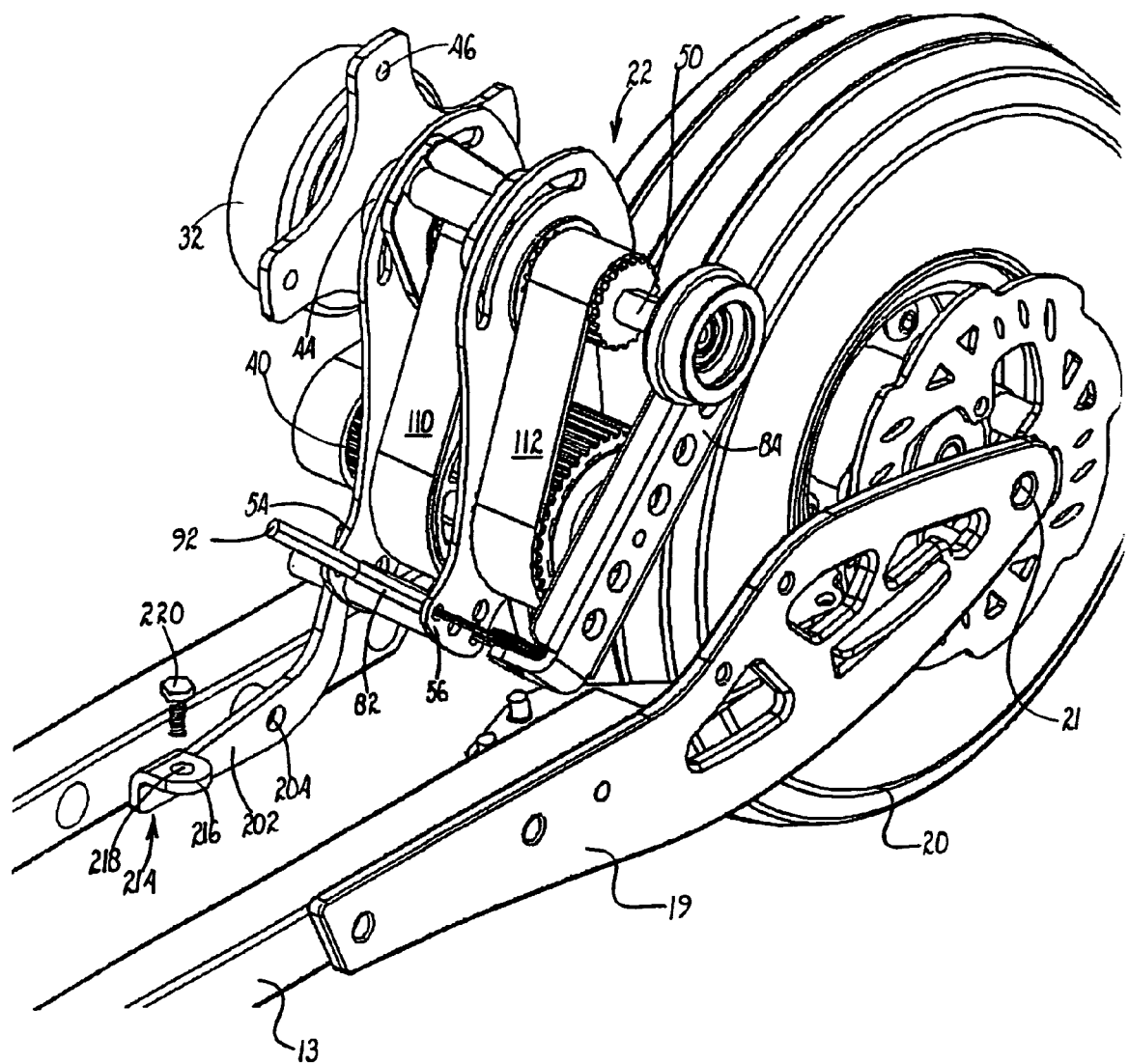
FIGS. 5 and 6 are views, from different sides, of a rear of the vehicle, with an engine and footboard removed, showing a drive belt tensioning arrangement.

It is evident that, within limits, the drive arrangement 22 is pivotal relatively to the second shaft 50. As has been noted the lower ends of the plates 54 and 56 are fixed to the brace 82. A lever 202, see FIG. 5, is pivotally mounted at a point 204 to the frame 13. One end 206 of the lever is held captive, in a sliding manner, in a slot 208 in an extension 210 of the brace 82, see FIG. 6. An opposing end 214 of the lever is formed with a flange 216 which has a hole 218. A bolt 220 is shown superimposed above the hole. Normally the bolt is directly engaged with a hole in the board 12 or with a support, not shown, on the frame 13. If the bolt is rotated in one direction the end 214 of the lever is moved downwardly while, if the bolt is rotated in an opposing direction, the end 214 is caused to move upwardly. In the first instance the end 206 of the lever moves downwardly and the drive arrangement 22 is caused to pivot about the axle 50 and the tension in the belt 200 is reduced. This is achieved without altering the tensions in the belts 110 and 112. On the other hand when the end 206 of the lever is raised the drive arrangement 22 is pivoted about the axis 50 in an upwards direction and the tension in the belt 200 is increased, again without altering the tensions in the belts 110 and 112. When the belt 200 has a suitable tension the bolt 220 is locked in position.

The ability to adjust the tension of the belt 200 without varying any setting in the drive arrangement 22 and without altering the position of the rear wheel 20 which is fixed to the frame 13 by means of the mounting plate 19 is significant and is attributable to the capability of the drive arrangement 22 to pivot about the axle 50 so that the only parameter in the drive arrangement which is meaningfully altered is the spacing between the pulley 40 and the axle 21 about which the rear wheel 20 rotates.

The drive arrangement of the invention is particularly compact and of simple construction. It can be accommodated with minimal space requirements between the engine 24 and the driven wheel 20 of the scooter. If the fasteners which fix the plates 64 and 66 to the plates 54 and 66 are loosened then it is possible to adjust the spacing between the first shaft 42 and the second shaft 50 so that the tensions in the belts 110 and 112 can be varied according to requirement.

In the illustrated embodiment and the preceding description the second shaft has two fixed drive members (the pulleys 104 and 106) secured to it and the first shaft has two variable drive members (the one-way bearing 124 and pulley 100, and the pulley 102 and the clutch, respectively) secured to it.

Figure 7:
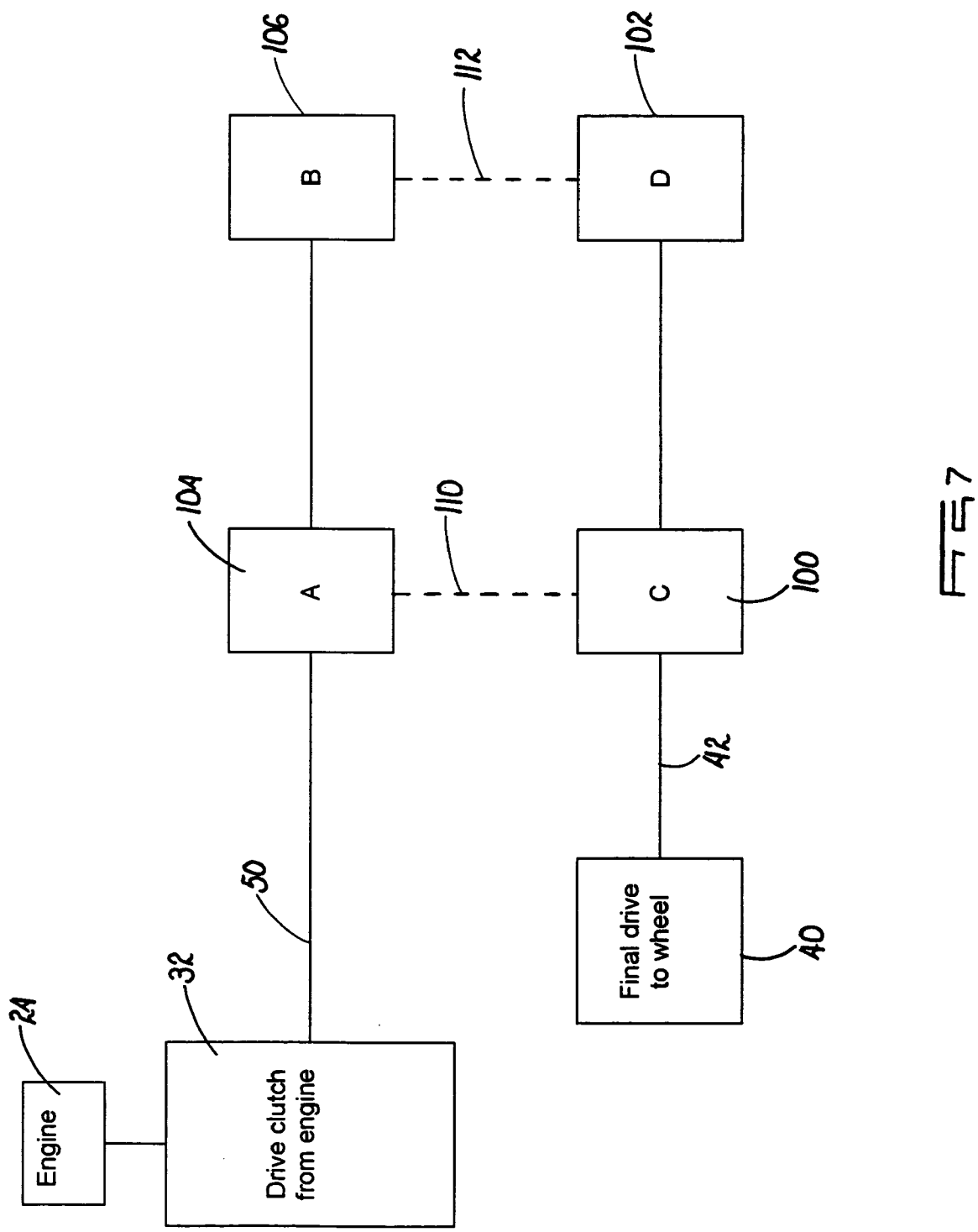
FIG. 7 schematically represents the drive arrangement of the invention in a generalized form.

FIG. 7 schematically represents the drive arrangement of the invention with the engine 24 transferring drive to the shaft 50 via the centrifugal clutch 32. The pulleys 104 and 106 are represented by blocks A and B respectively on the second shaft, and the bearing 124 and drive member 100, and the pulley 102 and the clutch, are represented by blocks C and D respectively on the first shaft 42 which transfers drive via the pulley 40 to the drive wheel.

The belts 110 and 112 are represented by dotted lines.

The following table illustrates different ways in which the principles of the invention can be implemented firstly, by using a clutch in place of the one-way drive mechanism and, secondly, by interchanging the positions of the components as depicted by the blocks A, B, C and D.

TABLE

| Arrangement | A | B | C | D |
| --- | --- | --- | --- | --- |
| 1 | fixed | fixed | one-way | clutch |
| 2 | fixed | fixed | clutch | clutch |
| 3 | clutch | clutch | fixed | fixed |
| 4 | one-way | clutch | fixed | fixed |
| 5 | clutch | fixed | fixed | clutch |
| 6 | one-way | fixed | fixed | clutch |
| 7 | fixed | clutch | one-way | fixed |
| 8 | fixed | clutch | clutch | fixed |

The drive arrangement described and illustrated is designated in the table as Arrangement 1. If a second clutch is used to replace the one-way assembly then Arrangement 2 results. The fixed devices could transferred to the first shaft or one fixed device could be on the second shaft at either of the locations A and B, and the other fixed device could be on the first shaft at either of the locations C and D.

There are a total of eight different arrangements. Although the inclusion of a one-way device is preferred this is not necessary for, as noted, the one-way device can be replaced by a clutch, similar in construction and operation to what has been described. If two clutches are used then all that is necessary is to toggle the clutches together so that when one clutch is engaged the other clutch is disengaged, and vice versa, except that as the clutches are adjusted between their engaged and disengaged modes there is a small overlap of clutch actuator or toggle movement during which both clutches are disengaged. Apart from eliminating clutch "whip" or backlash the feature that both clutches are simultaneously disengaged in a controlled manner with a clutch actuator or toggle at a predetermined position means that it is possible, if desired, to dispense with the centrifugal clutch between the engine and the second shaft for a neutral position of the drive arrangement can then be selected and each time a change in drive ratio, up or down, takes place the drive arrangement goes through neutral. This characteristic is not exhibited when a one-way device is present for the second shaft always drives the first shaft, but the second shaft does not rotate at low speeds due to the effect of the centrifugal clutch between the engine and the second shaft.

It is also possible to extend the principles described to provide three or more different drive ratio between the two shafts.

The invention has been described with particular reference to a drive arrangement for use in a two-wheeled scooter. This is merely by way of example for the drive arrangement can be used between any prime mover and driven component where at least a two speed drive ratio is required to be selected according to requirement.

The drive arrangement has been described as being based on the use of two pulleys and two ribbed belts. Any equivalent arrangement can be used in place of the pulleys and belts and, for example, the pulleys can be replaced by cogs and the belts can be replaced by chains. A combination of belts and pulleys, and chains and cogs, can also be employed. Generally though the use of belts and pulleys is preferred for operation thereof is not as noisy as when use is made of chains and cogs.

The invention claimed is:

1. A drive arrangement for connection between a prime mover and a driven component, the drive arrangement including a first shaft which is connected for rotatably driving the driven component, a second shaft which is connected for rotation by the prime mover, a first variable drive member which is selected from a one-way drive mechanism and a first clutch and which is connected to one of the first and second shafts, a first fixed drive member which is connected to the other of the first and second shafts, and a first endless flexible member operable to transfer rotational drive between the first variable drive member and the first fixed drive member, a second clutch which is connected to one of the first and second shafts, a second fixed drive member which is connected to the other of the first and second shafts, and a second endless flexible member operable to transfer rotational drive between the second clutch and the second fixed drive member.

2. A drive arrangement according to claim 1, further comprising a centrifugal clutch between the prime mover and the second shaft.

3. A drive arrangement according to claim 1, wherein the first shaft is parallel to and spaced from the second shaft.

4. A drive arrangement according to claim 1, wherein the one-way drive mechanism includes a one-way bearing.

5. A drive arrangement according to claim 1 wherein the first endless flexible member is a ribbed belt which passes over first and second pulleys engaged respectively with the first variable drive member and the first clutch.

6. A drive arrangement according to claim 1 wherein the second endless flexible member is a ribbed belt which passes over third and fourth pulleys engaged respectively with the second clutch and the second fixed drive member.

7. A drive arrangement according to claim 1 wherein the first and second endless flexible members are spaced apart from each other, and extend between the first and second shafts.

8. A drive arrangement according to claim 1 in combination with supporting structure to which the first and second shafts are mounted and which allows limited relative movement of the first shaft towards or away from the second shaft thereby to adjust tensions in the first and second endless flexible members.

9. A vehicle including a prime mover, a driven wheel and a drive arrangement connecting the prime mover and the driven wheel, the drive arrangement including a first shaft that is connected for rotatably driving the driven wheel, a second shaft which is connected for rotation by the prime mover, a first variable drive member which is selected from a one-way drive mechanism and a first clutch and which is connected to one of the first and second shafts, a first fixed drive member which is connected to the other of the first and second shafts, and a first endless flexible member operable to transfer rotational drive between the first variable drive member and the first fixed drive member, a second clutch which is connected to one of the first and second shafts, a second fixed drive member which is connected to the other of the first and second shafts, a second endless flexible member operable to transfer rotational drive between the second clutch and the second fixed drive member, and a third endless flexible member operable to transfer rotational drive from the first shaft to the driven wheel, wherein the prime mover is connected to drive the second shaft.

10. The vehicle according to claim 9, wherein the drive arrangement is movable to a limited extent relative to the driven wheel to thereby adjust tension in the third endless flexible member.

* * * * *